2,835,577

PHOTOSENSITIVE SYSTEM

Marilyn Levy, Red Bank, N. J., assignor to the United States of America as represented by the Secretary of the Army No Drawing. Application July 29, 1955
Serial No. 525,402

3 Claims. (Cl. 96—50)

(Granted under Title 35, U. S. Code (1952), sec. 266)

The invention described herein may be manufactured and used by or for the Government for governmental purposes without the payment of any royalty thereon.

This invention relates to a new photosensitive system which is capable of forming a print-out image on exposure to light which image is desensitized to further action by light after application of heat.

This invention is based on the discovery that colloidal dispersions of polyvinyl chlorides in water may be used as vehicles for photosensitive substances so as to obtain a photographic system that prints-out on exposure to light radiation and is desensitized to further action by light after the sole application of heat.

The details of the invention will become more apparent from the following description of specific embodiments of the broad inventive idea.

*Example I.*—0.25 gm. of silver succindiamidoxime is dispersed in 5 ml. water at 40° C. The dispersion is cooled to room temperature and then added with agitation to 10 gms. of "Geon 577." "Geon 577" is the trade name for a polyvinyl chloride latex emulsion containing approximately 55% solids; it is made by the B. F. Goodrich Chemical Company, Cleveland, Ohio.

The mixture of silver salt solution and the latex emulsion is then passed through a stainless steel homogenizer and may then be used to coat glass or paper to produce photosensitive panels. The panels are allowed to air dry for about 24 hours, exposed to a light source and then heat treated in an oven at about 110° C. for 1 to 8 hours depending upon the composition of the emulsion, the length of exposure, etc. The panels are then removed from the oven and allowed to cool to room temperature.

On reexposing the panels to strong ultra-violet light radiation it will be found that the emulsion has been considerably desensitized to further action by light.

Instead of "Geon 577" other polyvinyl chloride latex emulsions for instance those designated as "Geon 652" or "Geon 576" may also be used.

*Example II.*—0.5 to 1 gm. silver succindiamidoxime are dispersed in water in the manner described in Example I. 5 to 10 ml. sodium lauryl sulfate (2% solution) are then added and the mixture is treated as described above.

The finished panels show about the same degree of desensitizing after exposure to heat as the panels made according to Example I.

*Example III.*—0.25 gm. of silver succindiamidoxime and 10 gms. of "Geon 577," "Geon 652" or "Geon 576" are used for preparing the photosensitive emulsion with the addition of any of the following wetting agents added in a 2% solution: sodium 2-ethyl hexene sulfonate, sodium tetra decyl sulfate, sodium dioctyl phosphate, sodium heptadecyl sulfate, polyethylene glycol alkyl ethers and sodium 2-ethyl hexene sulfonate.

*Example IV.*—The emulsion is prepared using the following ingredients in the manner described above.

Geon 577, Geon 652 or Geon 576 _____ gm __ 10
Silver p-toluene sulfinate _____ gm __ .5–1
Wetting agent (2%) _____ ml __ 5–10

*Example V.*—The emulsion is prepared using Geon 577, Geon 652 or Geon 576—10 gms. silver benzene sulfinate .5–1 gm. wetting agent (2%) 5–10 ml.

It has generally been found that the light sensitivity of all the emulsions described can be improved considerably by the addition of certain surface active agents particularly those mentioned in Example III.

It will be understood by those skilled in the art that many variations and combinations are feasible within the broad inventive idea as defined in the following claims.

What is claimed is:

1. The process of making photographic images which comprises using a photographic system composed of a polyvinyl chloride emulsion having dispersed therein a member of the group consisting of silver succindiamidoxime, silver p-toluene sulfinate and silver benzene sulfinate, forming a print-out image by exposure of said system to light and desensitizing said system to further action by light with the sole application of heat.

2. The process of making photographic images according to claim 1 in which the light sensitivity of said silver salts is improved by the addition of a substance chosen from the group consisting of sodium lauryl sulfate, sodium 2-ethyl hexene sulfonate, sodium tetra decyl sulfate, sodium dioctyl phosphate, sodium heptadecyl sulfate, polyethylene glycol alkyl ethers and sodium 2-ethyl hexene sulfonate.

3. The process of making photographic images according to claim 1 in which the heat treatment is carried out at about 110° C. for 1 to 8 hours.

References Cited in the file of this patent

UNITED STATES PATENTS 2,538,297     De Nie _____ Jan. 16, 1951
2,772,159     Elliott _____ Nov. 27, 1956